UNITED STATES PATENT OFFICE.

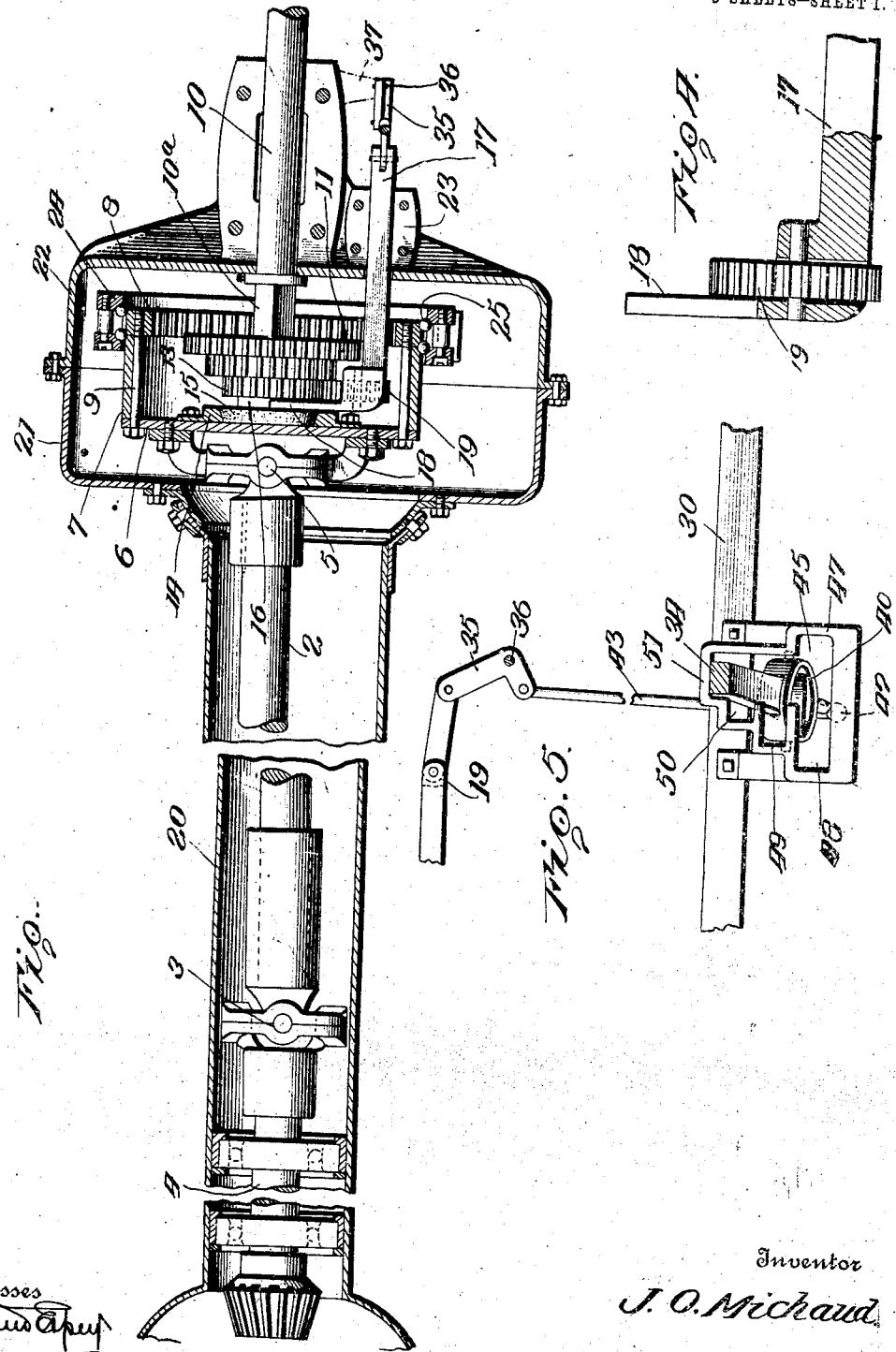

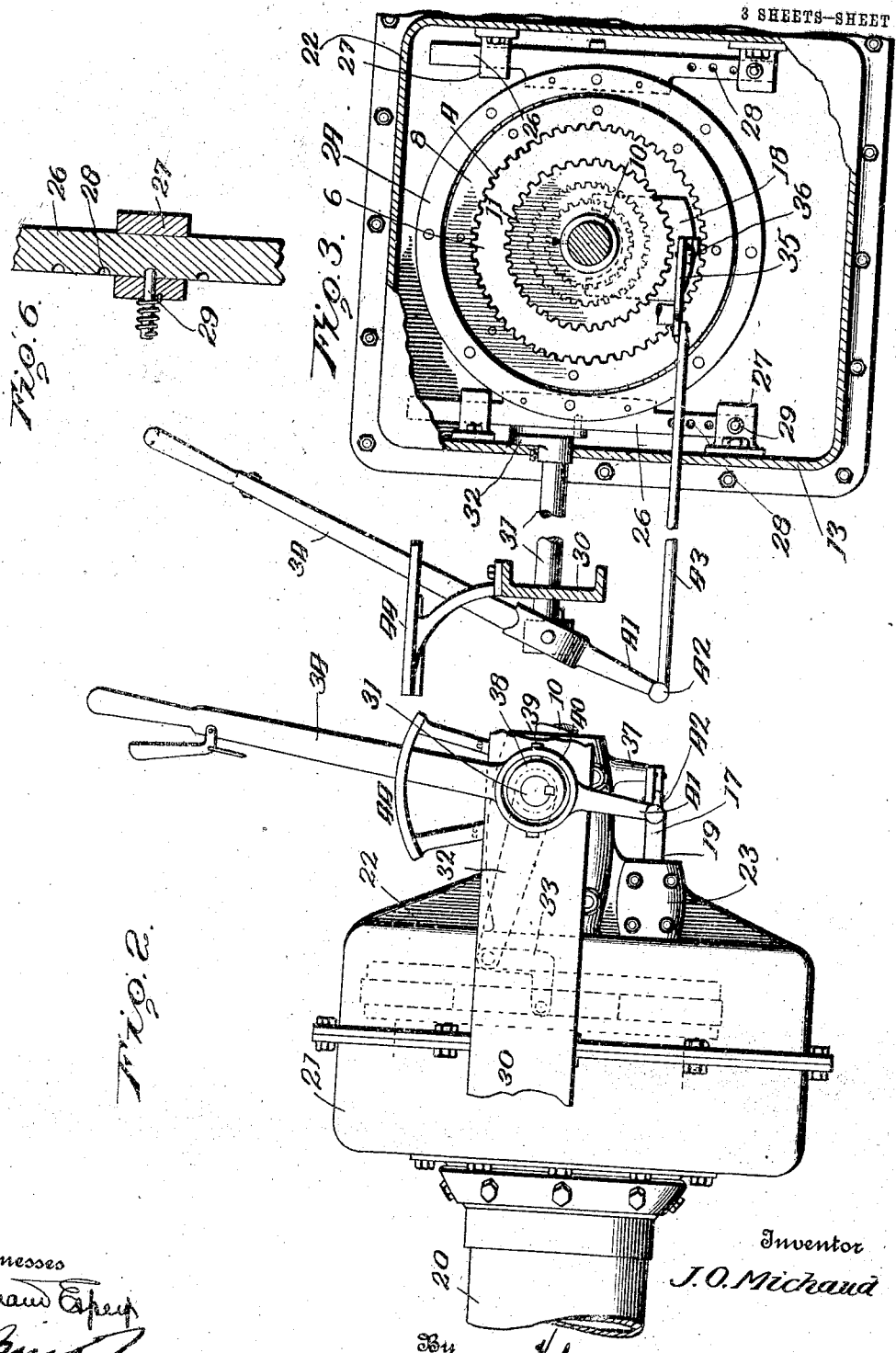

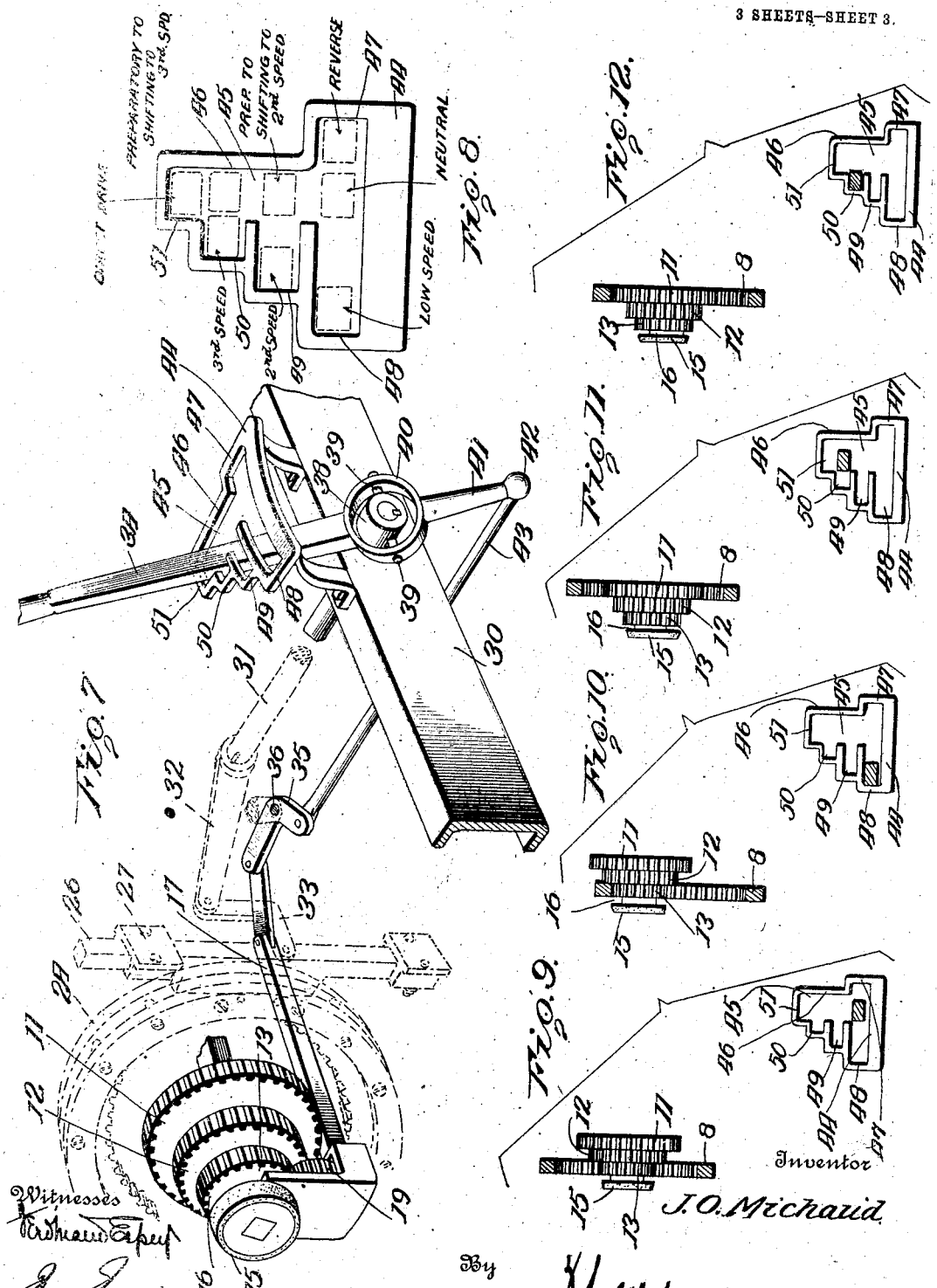

JOSEPH O. MICHAUD, OF FORT KENT, MAINE.

VARIABLE-SPEED-TRANSMISSION GEARING.

1,073,775.

Specification of Letters Patent. Patented Sept. 23, 1913.

Application filed June 14, 1912. Serial No. 703,735.

*To all whom it may concern:*

Be it known that I, JOSEPH O. MICHAUD, citizen of the United States, residing at Fort Kent, in the county of Aroostook and State of Maine, have invented certain new and useful Improvements in Variable-Speed-Transmission Gearing, of which the following is a specification.

This invention relates to variable speed transmission gearing adapted to be used on motor vehicles, and particularly relates to an improvement over the structure shown in my earlier Patent, No. 993,862, granted May 20, 1911.

The object of the present invention is to simplify and improve the structure illustrated in said prior patent and to provide a transmission gearing which may be easily and quickly operated to effect a change of speed when the vehicle is moving in a forward direction, and to provide means for reversing the application of power from the driving shaft to the driven shaft.

A further object of the invention is to provide means whereby a single actuating lever may be used for changing the speed or reversing the movement of the driven shaft instead of using two separate levers requiring two separate actuations.

A further object is to provide a construction of this character in which a single lever is used operatively connected to an internal gear to shift the same in one direction, and operatively connected to a cone or series of spur gears to shift the same transversely to the direction of movement of the internal gear so as to secure a coaction between the internal gear and any one of the spur gears, means being provided whereby the actuating lever may be guided in its movement and the extent of its movement limited so as to secure the proper coaction between the internal or driven gear and the driving or spur gear.

A further object in this connection is to provide means for eliminating any chance of moving either the driving or the driven gear beyond its proper position when the lever is operated.

Other objects will appear in the course of the following description.

Figure 1 is a longitudinal section through the housing incasing the transmission gearing, the internal gear and its support being in section. Fig. 2 is a side elevation of the housing and the lever for operating the transmission gearing. Fig. 3 is a front elevation of the transmission gearing, the housing being in section. Fig. 4 is a fragmentary detail partly in section of the gear shifting member 19. Fig. 5 is a detail plan view of the sector for the lever and the connection to the gear shifting rod. Fig. 6 is a fragmentary section of the member 26 showing the latch for holding the slide in position. Fig. 7 is a perspective view of the shiftable gear wheels, the lever for actuating the same and showing in dotted lines the internal gear, the slide on which it is mounted and the connections to the lever. Fig. 8 is a plan view of the sector gear and showing in dotted lines various positions of the gear shifting lever. Figs. 9, 10, 11 and 12 are diagrams illustrating the various positions of the shiftable gears relative to the internal gear and also showing the position of the lever corresponding thereto with reference to the sector.

Corresponding and like parts are referred to in the following description and indicated in all the views of the accompanying drawings by the same reference characters.

As illustrated in the accompanying drawings, my improved transmission gearing is shown applied to a driven shaft 2 which is connected by a universal joint 3 to a section of shafting 4 which is geared with the running gear of the vehicle, the manner of this gearing not being shown as it forms no part of my invention. The shaft 2 will be hereafter referred to as the driven shaft.

Carried upon the driven shaft by means of a universal joint 5 in a disk-like supporting member 6. The universal joint 5 is for the purpose of permitting the shaft 2 and the member 6 with it to move vertically, the member 6 however retaining a vertical position. Carried upon the member 6 and supported thereon in any suitable manner is an annulus 7 carrying at its edge the internal gear 8. This internal gear is shown as being bolted by bolts 9 to the disk-like member 6, but it might be supported thereon or on the annulus in any suitable manner.

The driving shaft 10 is mounted in fixed bearings in alinement with the shaft section 4. The inner end of the shaft 10 is many sided and supports upon it the gear wheels 11, 12, 13 and the clutch member 15 which meshes with or otherwise engages with a clutch member 14 carried upon the disk 6. As illustrated, these clutch members 14 and 15 are formed like gears with radially projecting intermeshing teeth, but I do not wish to be limited to this as any form of clutch members may be used.

Formed between the clutch member 15 and the gear wheel 13 is an annular groove 16 adapted to have engagement with a gear shifting rod 17. This gear shifting rod has an angularly extending fork which enters the annular groove 16. Inasmuch as the gear wheels 11, 12, 13 and 15 are all connected to each other either by being made integral or being mounted upon a sleeve surrounding the many sided termination 10ᵃ of the shaft 10, it will be obvious that a reciprocation of the gear shifting rod 17 will act to shift the cone of gears 11, 12, 13 and the clutch member 15 longitudinally upon the shaft 10, and longitudinally with reference to the internal gear 8.

Mounted upon the rod 17 in proximity to the forks 18 is a spur gear wheel 19 which meshes with the gear 13. It will be noted that the gear 11 is the largest gear, the gear 13 the smallest, and the gear 12 the intermediate gear. It will be understood that means are provided for shifting the rod 17 and thereby shifting the gears 11, 12, 13 and the clutch member 15, and that means are also provided for vertically shifting the internal gear 8.

The shaft section 4 and the shaft 2 is surrounded by a cylindrical casing 20 to which is bolted one section of a gear case 21 which incloses the annulus 7. The other half 22 of the gear case is carried by the bearings of the shaft 10 as illustrated in Fig. 1. The section 22 of the gear case is formed with a slotted hub 23 through which the shifting rod 17 projects and which acts as a support for the rod.

Arranged concentrically to the internal gear 8 is an annular bearing ring 24 having raceways formed in its internal face for the reception of antifriction balls 25. It will be understood, of course, that the internal gear 8 rotates within the annulus 24. This annulus is made in two laterally disposed sections so as to form a cone for the balls 25 these sections being held together in any suitable manner. The annulus 24 is attached in any suitable manner as by bolts to laterally disposed vertical bars 26 moving through guides 27 carried by the side walls of the section 22 of the gear case. The lower ends of the bars 26 are shown as formed with indentations 28 and the lower guides 27 are shown as provided with spring pressed pins 29 which engage in these depressions and act to yieldingly hold the slide formed by the members 26 and the annulus 24 in any adjusted position.

The means whereby the annulus 24 carrying the internal gear may be vertically shifted so as to raise or lower the internal gear to bring it into engagement with any one of the gears 11, 12, 13 and 19, is as follows: Mounted upon the frame beam 30 of the machine or in any suitable manner is a shaft 31 which extends laterally and enters an extension of the gear case 22. This shaft carries a radially projecting arm 32, seen in dotted lines in Fig. 2, and this arm at its inner end is pivotally connected to an angular link 33 whose lower end is pivotally connected to the adjacent bar 26. The shaft 31 is connected as will be hereafter described to a lever 34 and it will be obvious that when the shaft 31 is rotated in one direction or the other by the lever, the slide formed by the annulus 24 and the bars 26 will be raised or lowered.

In order to provide for a longitudinal reciprocation of the gear wheels 11, 12, 13 and the clutch member 15 and the spur pinion 19, I connect the extremity of the shifting rod 17 to a bell crank lever 35 which is pivoted at 36 upon a downwardly projecting hub 37 extending downward from the bearing of the shaft 10. The shaft 31 carries at its extremity a collar 38 having laterally projecting pins 39, and mounted upon these pins is a ring-like member 40 forming part of the lever 34. The lever is continued as at 41 below the ring-like member 40 and has a ball and socket connection 42 to a rod 43 pivoted at its end to the extremity of the bell crank lever 35 as illustrated in Fig. 4. Inasmuch as the lever is mounted upon the pins 39, it will be obvious that the lever has not only a movement parallel to the frame beam 30, but that it may also have a movement transverse to the frame beam, and it will be seen from Fig. 5 that this transverse movement will act to push or pull upon the rod 43, thus operating the bell crank lever 35, and thus through the shifting rod 17 act to shift the gears 11, 12, 13, 15 and 19. It will further be seen that if the lever 34 is moved in the general direction of the beam 30 and at the same time is shifted laterally, it will have a compound movement which will act to simultaneously shift the slide formed by the annulus 24 and the bars 26 and simultaneously shift the transmission gears.

Mounted upon the beam 30 or in any other suitable manner, is a segment designated generally 44, which segment is so constructed as to provide for a movement of the lever 34 in two directions. The form of this segment is illustrated particularly in Fig. 8. It will be seen that the segment extends parallel to the beam 30 and also extends at right angles to the beam. The segment is formed with an opening 45 through which the lever projects. One wall of this opening is straight as at 46 for a greater portion of its length, but adjacent to the beam 30 this wall 46 is laterally offset as at 47. The opposite wall of the opening, however, is stepped so as to provide a series of sockets 48, 49, 50 and 51, the socket 48 being immediately opposite the offset portion 47 of the wall, the socket 49 being less in depth than the socket 48, the socket 50 being less in depth than the socket 49, and the socket 51 being less in depth than the socket 50, that is, the walls of these sockets define extensions of the opening 45 adapted to receive the lever 34 and the extensions of this opening getting gradually shorter from the socket 48 to the socket 51, the socket 51 being located at the outer extremity of the segment. It will be seen that the outer walls of these sockets 48, 49, 50 and 51 form stops limiting the throw of the lever in that direction of the stop, and that the wall 47 also forms a stop limiting the throw of the lever in that direction.

It is to be particularly noted that a movement of the lever parallel to the length of the beam 30 will not act to either push or pull upon the rod 43 and thus will not act to shift the gears 11, 12, 13, 15 and 19, but that this movement of the lever will simply act to raise or lower the internal gear 8. A movement of the lever upon the pivot pins 39 and at right angles to the plane of the beam 30 will not act to shift the internal gear but will act to operate the bell crank 35 and thus shift the cone of transmission gears, and that if the lever 34 is not only moved approximately parallel to the beam 30 but is also moved at an angle thereto so as to shift the lower end of the lever laterally, the cone of transmission gears will be shifted to correspond with the shifting of the internal gear. Thus to raise or lower the internal gear, the lever is shifted in the direction of the length of the opening 45 in the segment 44 and to shift the cone of transmission gears so as to bring one or the other of the transmission gears into engagement with the internal gear, or to bring the clutch member 15 into engagement with the clutch member 16, the lever is shifted transversely in the segment so as to engage in one or the other of the sockets 48, 49, 50 or 51, or into the socket 47.

The neutral position of the parts, that is, the position wherein all the gears of the cone are disconnected from the internal gear, is that shown in Fig. 9. In this position of the lever, the gear 13 is opposite the internal gear. Now if the lever be rotated to the left, the shaft 31 will be rotated, drawing the internal gear downward and into engagement with the gear 13 (see Fig. 10). In this position of the parts the speed of the shaft 2 is much reduced relative to the speed of the shaft 10. To move from the slow speed to the next higher speed, the lever is shifted back to its neutral position, then shifted along the neutral line to a position opposite the socket 49. This brings gear 12 opposite the internal gear, and when the lever is shifted into the socket 49, the shaft 31 is rotated shifting the internal gear 8 downward into mesh with gear 12, thus giving the second speed. To shift to the next higher speed, the lever is shifted back to the neutral line and then shifted laterally until it is opposite the socket 50 as in Fig. 11. This brings gear 11 opposite the internal gear, and when the lever is shifted into the socket 50, the shaft 31 is rotated to shift the internal gear into mesh with the gear 11, thus providing for the third speed where the speed of the shaft 2 is nearly that of the shaft 10, as in Fig. 12. To secure now a direct drive where the speed of the shaft 2 shall be the same as that of the shaft 10, the lever is shifted back to the neutral line, thus raising the internal gear to a neutral position. A further movement of the lever into the socket 51 throws the cone of gears forward and throws the clutch member 15 into engagement with the clutch member 14. In order to reverse the direction of rotation of the shaft 2, it is necessary to bring the spur wheel 19 into engagement with the internal gear. To do this, the lever is brought back to the neutral position shown in Fig. 9, thus shifting gear 13 opposite to the internal gear and then the lever is shifted into the socket 47, this socket being relatively shallow and there being only a small movement required in order to shift the internal gear into mesh with the teeth of the spur gear 19. It is to be particularly noted in this connection that the gear 13 may not only be driven directly from the internal gear and thus constitute the first or slowest speed, but it may also be driven through the spur gear and thus be used to reverse the shaft.

It will be of course understood that the embodiment of the invention illustrated in the drawing may be modified in many ways without departing from the spirit thereof, and that while I have described my variable speed transmission gearing as being applied to use with an automobile, it may be applied in any other circumstances for which it may be found adapted. It will also be obvious that I may increase or decrease the number of spur gear wheels and thereby succeed in securing either a three speed forward transmission or a five speed forward transmission, and this without departing from the spirit of the invention.

Having described my invention, what I claim is:

1. A transmission gearing including a driving shaft, a driven shaft, an internal gear carried by one shaft, a series of gears having different diameters and shiftably mounted upon the other shaft, a lever, a rock shaft operatively connected to the internal gear, said lever being pivotally mounted upon the rock shaft for movement in a plane coincident to the rock shaft and engaging said rock shaft for rotative movement therewith, and connections between the lever and the cone of gears whereby the latter may be shifted upon a rocking of the lever in a plane parallel to the rock shaft.

2. A transmission gearing including a shaft, a coacting shaft pivotally mounted at one end and movable in one plane with relation to the first named shaft, an internal gear pivotally mounted upon the first named shaft and movable therewith, a cone of gears shiftably mounted upon the first named shaft and movable in a plane at right angles to the plane of movement of the internal gear and second named shaft, and common means for shifting the second named shaft and internal gear in one plane and the cone of gears in a plane at right angles thereto.

3. A transmission gearing including a driving shaft, a driven shaft, an internal gear carried by one shaft and movable in one plane, a cone of gears shiftably mounted upon the other shaft and movable in a plane at right angles to the plane of movement of the internal gear, common means for shifting said internal gear and the cone of gears in planes at right angles to each other, and means for detachably locking said gears in shifted position.

4. A transmission gearing including a driving shaft, a driven shaft, an internal gear carried thereby, a slide supporting the internal gear and the driven shaft, guides carried by said slide, latching devices detachably engaging said yielding slide to hold it in adjusted position, a cone of gears shiftably mounted on the driving shaft and movable in a plane at right angles to the plane of movement of the internal gear, and means for simultaneously shifting the said slide and the cone of gears in planes at right angles to each other.

5. A transmission gearing including a driving shaft, a driven shaft, an internal gear carried by one shaft and movable in one plane, a slide surrounding the internal gear, antifriction devices disposed between the slide and the internal gear, a cone of gears shiftably mounted upon the other shaft and movable in a plane at right angles to the plane of movement of the internal gear, a casing surrounding said gears, a shifting member extending through said casing and engaging said cone of gears, a spur gear mounted upon said shifting member and in engagement with one of said last named gears, and common means for shifting said slide in one plane and shifting said cone of gears in a plane at right angles thereto.

6. A transmission gearing including a driving and a driven shaft, an internal gear carried by one shaft and shiftable in one plane, a series of stepped gear wheels carried by the other shaft and shiftable thereon in a plane at right angles to the plane of movement of the internal gear, a lever, a rock shaft connected thereto and operatively connected to the internal gear, a shifting rod operatively connected to the stepped gears, a bell crank lever connected to the shifting rod, and connections between said bell crank and said lever.

7. A transmission gearing including a driving shaft, a driven shaft, the end of the driven shaft adjacent the driving shaft being freely movable in one plane, an internal gear carried by said driven shaft, a slide carrying said internal gear, a series of stepped gear wheels shiftably mounted upon the driving shaft and having movement in a plane transverse to the plane of movement of the internal gear, a lever pivotally mounted for movement in two directions, a rock shaft operatively engaged by the lever upon a movement in one direction and operatively connected with said slide to raise and lower the same upon a rotative movement of the rock shaft, a shifting rod engaging said gear wheels, a bell crank lever connected to the shifting rod, and a connection between said bell crank lever and the lower end of the operating lever.

8. A transmission gearing including a driving shaft, a driven shaft, the latter being pivotally supported at one end and free to move in a vertical plane at the other end, an internal gear carried at the free end of the driven shaft, a series of stepped gear wheels mounted upon the driving shaft and longitudinally shiftable to bring any one of the wheels into or out of alinement with the internal gear, a rock shaft having an arm operatively connected to the internal gear to raise or lower the same into or out of engagement with the gear wheels, a lever pivotally mounted upon the rock shaft for movement with the rock shaft or independent movement in a plane parallel thereto, said lever extending below the rock shaft, a shifting rod connected to said gear wheels and extending parallel to the driving shaft, a bell crank connected to the shifting rod, and a connection between the bell crank and the lower end of the actuating lever.

In testimony whereof I affix my signature in presence of two witnesses.

JOSEPH O. MICHAUD. [L. S.]

Witnesses:
 HENRY W. NADEAU,
 IRÈNÉE R. CYR.